United States Patent [19]
Jackson

[11] 3,871,373
[45] Mar. 18, 1975

[54] HUMIDIFYING GAS

[76] Inventor: Richard R. Jackson, Eight Trinity Rd., Marblehead, Mass. 01947

[22] Filed: Oct. 30, 1972

[21] Appl. No.: 301,773

[52] U.S. Cl.................. 128/193, 128/212, 261/104
[51] Int. Cl..................... A61m 15/00, A61m 15/08
[58] Field of Search .......... 128/193, 194, 212, 195, 128/201, 208, 206, 198, 183, 191, 192, 185; 55/16, 158; 165/3, 19; 261/99, 104

[56] References Cited
UNITED STATES PATENTS

| 2,227,536 | 1/1941 | D'Agostino | 128/192 |
| 2,812,762 | 11/1957 | Jordan et al. | 128/191 R |
| 3,019,646 | 2/1962 | Gavin | 128/185 X |
| 3,251,361 | 5/1966 | Rosz | 128/191 R |
| 3,367,850 | 2/1968 | Johnson | 55/158 |
| 3,463,589 | 8/1969 | Skala | 261/104 |
| 3,532,270 | 10/1970 | Schoen, Jr. | 261/104 |
| 3,540,445 | 11/1970 | Moyat | 128/183 |
| 3,616,796 | 11/1971 | Jackson | 128/212 |
| 3,638,926 | 2/1972 | Melville et al. | 128/192 |
| 3,689,038 | 9/1972 | Martin | 55/158 |

FOREIGN PATENTS OR APPLICATIONS

| 175,187 | 8/1964 | U.S.S.R. | 128/194 |

Primary Examiner—Richard A. Gaudet
Assistant Examiner—Lee S. Cohen

[57] ABSTRACT

Apparatus for humidifying and delivering gas to a patient featuring a gas conduit having an inlet communicating with a source of the gas, and an outlet, a water chamber coextensive over a zone with a portion of the gas conduit, the chamber or the conduit having a wall permeable to water vapor at the zone, and means for bringing water into intimate contact with one side of the wall at the zone at a vapor pressure sufficient to cause passage of water vapor through the wall and into the conduit to humidify gas therein.

15 Claims, 7 Drawing Figures

HUMIDIFYING GAS

BACKGROUND OF THE INVENTION

This invention relates to humidifying and delivering gases such as air or oxygen to a patient. Some aspects of the invention are disclosed and claimed in my U.S. Pat. No. 3,616,796 (Nov. 2, 1971), the disclosure of which is hereby incorporated by reference.

The invention provides compact, simple, reliable, easily manufactured, inexpensive, light weight humidification apparatus useful in a variety of applications (e.g., with a wall oxygen outlet, a respirator, anesthesia apparatus, portable breathing aids such as used in connection with laryngectomy or tracheostomy); minimizes condensation of water in the gas tube (thus improving operation and reducing the need to empty condensed water reservoirs); makes possible humiidification without a large air chamber; and provides for uniform, effective introduction of water vapor into the gas stream, without surges, and without danger of drowning the patient. The apparatus is easily handled, is comfortable to the patient in use, and need not be interrupted in operation for refilling or the like.

In general, the invention features a gas conduit having an inlet communicating with a source of the gas, and an outlet, a water chamber coextensive over a zone with a portion of the gas conduit having a wall permeable to water vapor at the zone, and means for bringing water into intimate contact with one side of the wall at the zone at a vapor pressure sufficient to cause passage of water vapor through the wall and into the conduit to humidify gas therein.

In preferred embodiments the chamber is a water conduit inside the gas conduit and is of water vapor permeable material; the water conduit is folded on itself to provide a plurality of runs in the gas conduit, increasing the surface area of the permeable material; the wall is impermeable to liquid water under operating conditions; and the wall is of expanded polytetrafluoroethylene.

In other embodiments the water chamber is a portable water bag, and the gas conduit runs through the bag and is permeable to water vapor; the gas conduit is serpentine; and water and gas channels are formed by heat sealing sheet material along staggered lines.

Other advantages and features of the invention will be apparent from the following description of preferred embodiments thereof, taken together with the drawings, in which.

DESCRIPTION OF THE PREFERRED EMBODIMENT

Figure 1:
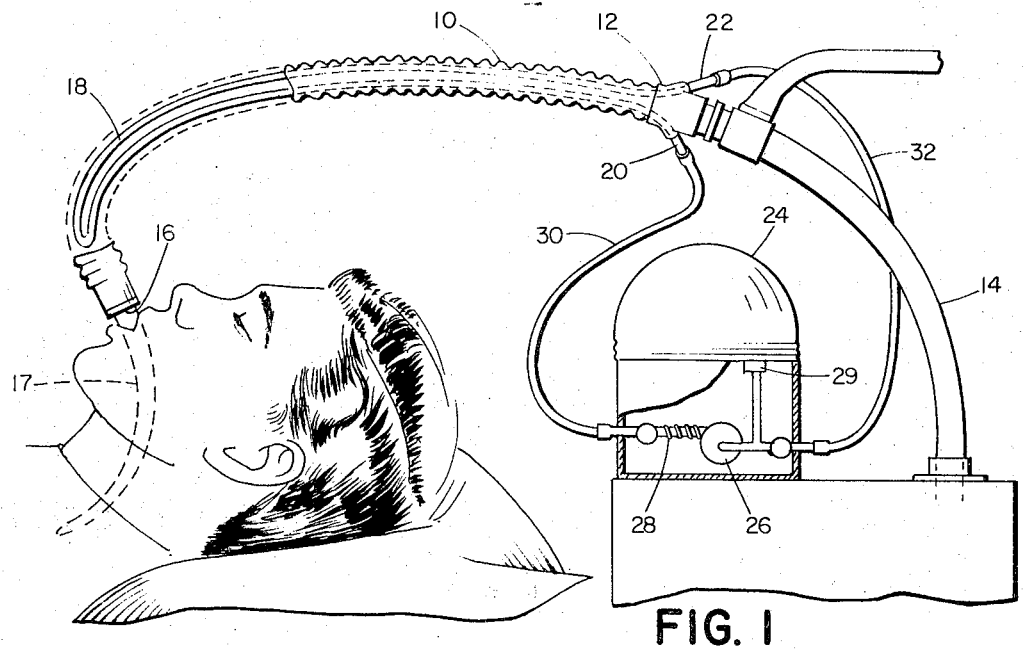
FIG. 1 is a side view, partly broken away, of a respirator.

Referring to the drawings, FIG. 1 shows a respirator in which air is supplied orally to the patient through a corrugated delivery tube 10 having an inlet end 12 connected to a conventional air supply conduit 14, and an outlet end 16 connected to endotracheal tube 17. Water tube 18 is folded on itself inside tube 10 to provide runs 20, 22, with the ends of the water tube exiting from tube 10 at inlet end 12. Twenty-four hour water supply reservoir 24 provides water by gravity feed to pump 26 which in turn supplies water to tube 18 through heater 28 and conduit 30. Water is returned to the pump from tube 18 through conduit 32. Runs 20 and 22 are each coextensive with tube 10, and all connections to the water tube are outside the air circuit, reducing the risk of leaks into the air stream. As further insurance, flow restrictor 29 between the reservoir and the pump limits the water flow rate to below that which could endanger the patient even in the event of a leak.

Tube 18 is constructed of a material permeable to water vapor but preferably impermeable to liquid water, over the intended operating range of vapor and water pressure. A preferred material is expanded polytetrafluoroethylene (3/16 inch O.D. tubing with 1/32 inch wall thickness), such as is available from W. L. Gore and Associates, Inc., Newark, Del., under the trade designation Gore-Tex.

In operation with air flowing through tube 10, and with water at preferably 100°F flowing through tube 18, the water vapor pressure will be sufficient to cause vapor to pass through the wall of the water tube to humidify the air. So long as the water pressure is below the "breakthrough pressure," the hydrophobic characteristic of polytetrafluoroethylene will keep the water tube wall from passing water in liquid form. The water temperature will affect the vapor pressure and hence establishes the degree of humidification as well as warming the air. The multiple runs of water tube provide large surface area making possible a high degree of humidification without the danger of forcing water into the air circuit. Reservoir 24 may be refilled without interruption of the apparatus. The internal location of the water tube allows the use of delivery tubes of convectional diameter and length; avoids any need for joints or breaks or connections in the water tube within the air circuit, increasing the protection of the air circuit from water leaks; and enables the use of small diameter water tubing, increasing mechanical strength while keeping the system lightweight and flexible for ease of handling and patient comfort. The mechanical independence of the air and water tubes over most of their length contributes to flexibility.

Figure 2:
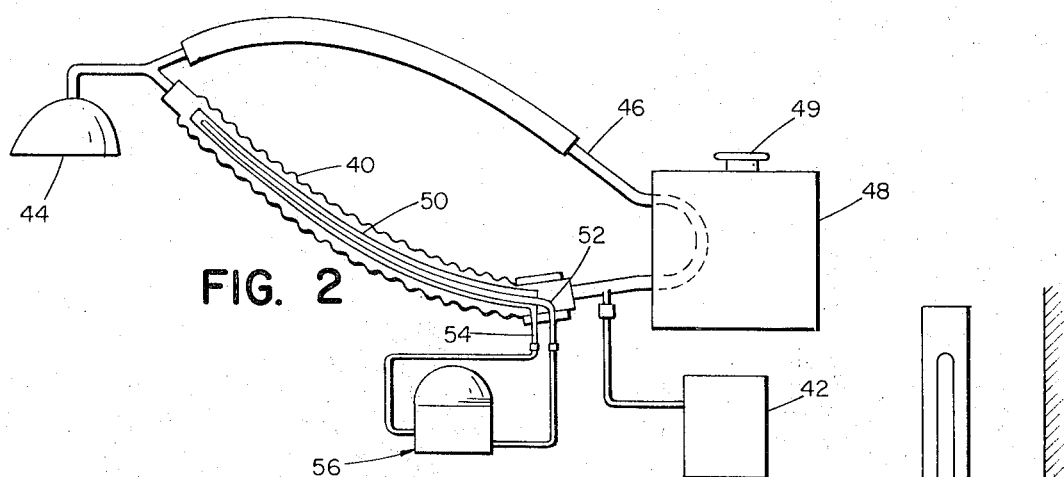
FIG. 2 is a side view, partly broken away, of anesthesia apparatus.

In FIG. 2 air tube 40 carries oxygen and anesthesia gas from source 42 to mask 44 in a semi-closed circuit in which return line 46 passes through $CO_2$ absorber 48 having a relief valve 49. Water tube 50 (⅞ inch I.D. polytetrafluoroethylene) has sealed ends and receives water supply and return tubes 52 and 54 (the former extending to the downstream end of tube 50 to ensure water flow throughout its length) connected to reservoir-pump 56. In use, operation is much as described above; the lesser surface area of the water tube corresponds to the decreased vapor requirements in the anesthesia apparatus by comparison to the respirator of FIG. 1.

Figure 3:
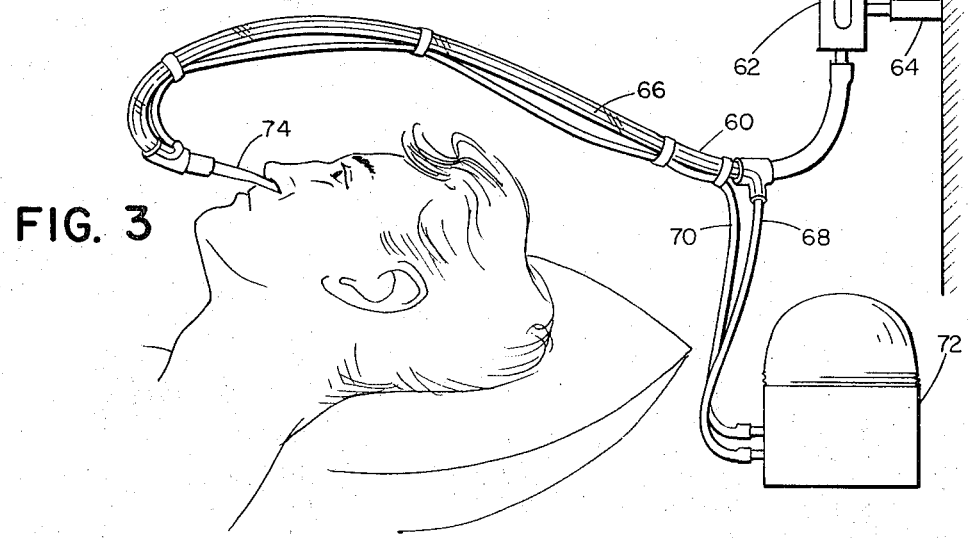
FIG. 3 is a side view, partly broken away, of respirator apparatus with an oxygen wall outlet.

FIG. 3 shows a gas tube 60 connected through flow meter 62 to an oxygen outlet 64 on a hospital wall. Polytetrafluoroethylene water tube 66 extends internally the length of tube 60 and is connected at opposite ends through the gas tube wall to water supply and return conduits 68, 70 in turn connected to reservoir pump assembly 72. Nasal catheter 74 is connected to the downstream end of the gas tube and supplies humidified oxygen to the patient.

Figure 4:
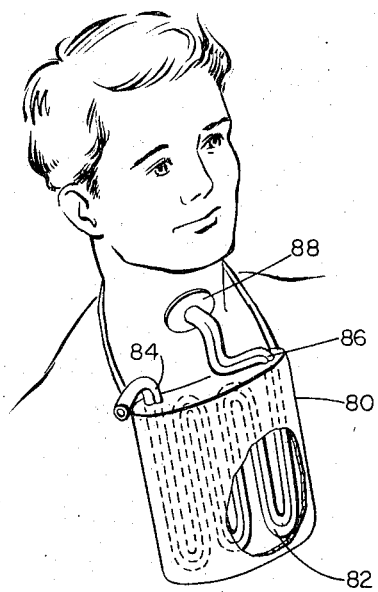
FIGS. 4 and 5 show portable, body heated humidifiers with throat and nasal connections, respectively.

FIG. 4 shows a water bag 80 hung around a user's neck for warming by body heat. Inside the bag a serpentine air tube 82 with polytetrafluoroethylene walls runs between inlet 84 and outlet 86, the inlet communicating with the atmosphere, the outlet with a breathing-manifold 88 in the user's neck. This inexpensive, portable, disposable system provides humidified air to a person with a larynegectomy, and also is useful in connection with tracheotomy patients. A similar system is shown in FIG. 5, with the air tube inlet connected to a portable container 90 of liquid oxygen, and the outlet connected to a nasal catheter 92.

Figure 5:
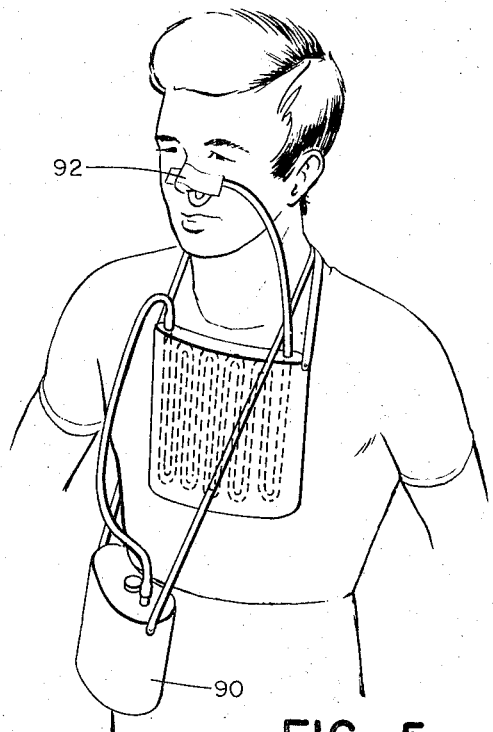
Figure 6:
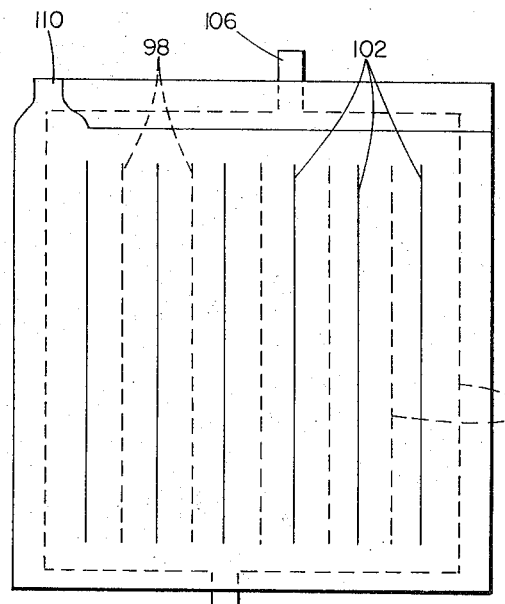
FIG. 6 is a diagrammatic plan view of a construction useful in the devices of FIGS. 4 and 5.
Figure 7:
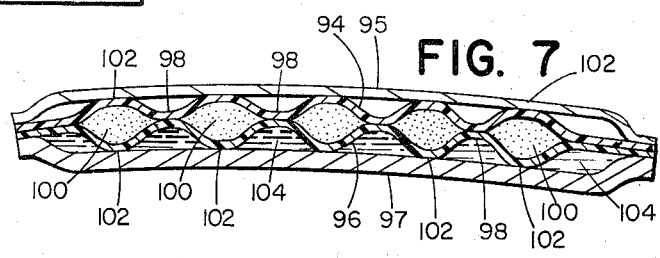
FIG. 7 is a sectional view of the construction of FIG. 6.

FIGS. 6 and 7 show a method of fabricating the systems of FIGS. 4 and 5 from sheet material by heat sealing. Sheet 96 of laminated permeable polytetrafluoroethylene and permeable polyethylene is heat sealed to sheet 94 along lines 98 to form air channels 100, and sheets 94 and 96 are in turn heat sealed to outer polyethylene-mylar laminate sheets 95 and 97 (reflective, for insulation) at lines 102 staggered between lines 98 to form water channels 104. The seal lines stop short of the tops and bottoms of the respective sheets to provide a common manifold for like channels. The sheets are sealed to each other around their peripheries. Air connections 106 and 108 are provided to the air channels, and water fill opening 110 is provided to the water channels. The manifold air channels reduce restriction in the air flow to the breather.

In another embodiment, similar to FIG. 1 or 2, the pump is omitted and instead the water tube 18 or 50 is filled with non-circulating water replenished by a supply hose connected through a drip chamber to a flask. An electrical resistance heater wire, e.g., nichrome, extends inside the water tube, throughout its length, and maintains the water at the desired temperature. The drip device provides the safety feature of limiting the amount of water which might enter the air passage in the event of leakage of the tube 18 or 50.

Other embodiments are within the following claims.

What is claimed is:

1. Apparatus for humidifying a gas and delivering it to be breathed, comprising
    a gas conduit having an inlet for communicating with a source of said gas, and an outlet, for enabling flow of gas along said conduit,
    a water chamber coextensive over a zone with a portion of said gas conduit,
    said chamber or said conduit having a wall permeable to water vapor at said zone,
    means for causing liquid water to flow along said wall in intimate contact with one side thereof at said zone at a vapor pressure sufficient to cause passage of water vapor through said wall and into said conduit to humidify gas therein, said water flow being co-current with said flow of gas along at least a portion of said wall, and
    means for delivering the humidified gas to a patient.

2. The apparatus of claim 1 wherein said water chamber has an inlet and an outlet, a water pump has feed and return ports respectively connected to said inlet and outlet, and a water reservoir is connected to said pump to replenish water vaporized through said wall.

3. The apparatus of claim 2 further comprising means to heat to at least 100° F water entering said inlet.

4. Apparatus for humidifying a gas and delivering it to be breathed, comprising
    a gas conduit having an inlet for communicating with a source of said gas, and an outlet,
    a water chamber coextensive over a zone with a portion of said gas conduit,
    said chamber of said conduit having a wall permeable to water vapor at said zone,
    means for bringing liquid water into intimate contact with one side of said wall at said zone at a vapor pressure sufficient to cause passage of water vapor through said wall and into said conduit to humidify gas therein, and
    means for delivering the humidified gas to a patient,
    said chamber being a water conduit inside said gas conduit and being of water vapor permeable material.

5. The apparatus of claim 4 wherein said water conduit is folded on itself to provide a plurality of runs in said gas conduit, increasing the surface area of said permeable material.

6. The apparatus of claim 4 wherein said water conduit is continuous and integral inside said gas conduit, reducing the risk of water leakage into said gas conduit.

7. The apparatus of claim 4 wherein said conduits are mechanically indepedent of each other over the major portion of their coextent, increasing flexibility.

8. The apparatus of claim 4 wherein said conduits are elongated tubes.

9. Apparatus for humidifying a gas and delivering it to be breathed, comprising
    a gas conduit having an inlet for communicating with a source of said gas, and an outlet,
    a water chamber coextensive over a zone with a portion of said gas conduit,
    said chamber or said conduit having a wall permeable to water vapor at said zone,
    means for bringing liquid water into intimate contact with one side of said wall at said zone at a vapor pressure sufficient to cause passage of water vapor through said wall and into said conduit to humidify gas therein, and
    means for delivering the humidified gas to a patient,
    said wall being impermeable to liquid water under operating conditions.

10. Apparatus for humidifying a gas and delivering it to be breathed, comprising
    a gas conduit having an inlet for communicating with a source of said gas, and an outlet,
    a water chamber coextensive over a zone with a portion of said gas conduit,
    said chamber or said conduit having a wall permeable to water vapor at said zone,
    means for bringing liquid water into intimate contact with one side of said wall at said zone at a vapor pressure sufficient to cause passage of water vapor through said wall and into said conduit to humidify gas therein, and
    means for delivering the humidified gas to a patient,
    said wall being of expanded polytetrafluoroethylene.

11. Apparatus for humidifying a gas and delivering it to be breathed, comprising
    a gas conduit having an inlet for communicating with a source of said gas, and an outlet,
    a water chamber coextensive over a zone with a portion of said gas conduit, said chamber or said conduit having a wall permeable to water vapor at said zone, means for bringing liquid water into intimate contact with one side of said wall at said zone at a vapor pressure sufficient to cause passage of water vapor through said wall and into said conduit to humidify gas therein, and means for delivering the humidified gas to a patient, said water chamber being a tube inside said gas conduit, said tube being sealed at its ends, means for supplying water being provided, water feed and return tubes being connected to said chamber, extending to the exterior of said conduit, and being connected to supply said water chamber with circulating water, said feed tube being connected to said means for supplying water and said conduit being connected in an anesthesia loop passing through a $CO_2$ exchanger.

12. The apparatus of claim 11 wherein said water feed and return tubes enter said water chamber at the same end, said feed tube extending to the other end of said chamber to deliver water there.

13. Apparatus for humidifying a gas and delivering it to be breathed, comprising a gas conduit having an inlet for communicating with a source of said gas, and an outlet, a water chamber coextensive over a zone with a portion of said gas conduit, said chamber or said conduit having a wall permeable to water vapor at said zone, means for bringing liquid water into intimate contact with one side of said wall at said zone at a vapor pressure sufficient to cause passage of water vapor through said wall and into said conduit to humidify gas therein, and means for delivering the humidified gas to a patient, said gas conduit having, at its outlet and inlet ends, connections to a nasal catheter and an oxygen wall outlet, respectively.

14. Apparatus for humidifying a gas and delivering it to be breathed, comprising a gas conduit having an inlet for communicating with a source of said gas, and an outlet, a water chamber coextensive over a zone with a portion of said gas conduit, said chamber or said conduit having a wall permeable to water vapor at said zone, means for bringing liquid water into intimate contact with one side of said wall at said zone at a vapor pressure sufficient to cause passage of water vapor through said wall and into said conduit to humidify gas therein, means for delivering the humidified gas to a patient, and means for restricting the flow rate of water to said wall to below a predetermined safety limit.

15. Apparatus for humidifying a gas and delivering it to be breathed, comprising a gas condudit having an inlet for communicating with a source of said gas, and an outlet, a water chamber coextensive over a zone with a portion of said gas conduit, said chamber or said conduit having a wall permeable to water vapor at said zone, means for bringing liquid water into intimate contact with one side of said wall at said zone at a vapor pressure sufficient to cause passage of water vapor through said wall and into said conduit to humidify gas therein, means for delivering the humidified gas to a patient, and an electrical resistance heating element extending along said zone.

* * * * *

UNITED STATES PATENT OFFICE
CERTIFICATE OF CORRECTION

Patent No. 3,871,373            Dated March 18, 1975

Inventor(s) Richard R. Jackson

It is certified that error appears in the above-identified patent and that said Letters Patent are hereby corrected as shown below:

The term of this patent subsequent to

November 2, 1988, has been disclaimed.

Signed and Sealed this twenty-second Day of June 1976

[SEAL]

Attest:

RUTH C. MASON
Attesting Officer

C. MARSHALL DANN
Commissioner of Patents and Trademarks